United States Patent
Eagle et al.

(10) Patent No.: US 8,585,861 B2
(45) Date of Patent: *Nov. 19, 2013

(54) HEAT-RESISTANT STRUCTURAL EPOXY RESINS

(75) Inventors: Glenn G. Eagle, Bloomfield Hills, MI (US); Andreas Lutz, Gulgenen (CH)

(73) Assignee: Dow Global Technologies LLC, Midland, MI (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/344,635

(22) Filed: Jan. 6, 2012

(65) Prior Publication Data

US 2012/0103517 A1    May 3, 2012

Related U.S. Application Data

(62) Division of application No. 12/099,804, filed on Apr. 9, 2008, now Pat. No. 8,097,119.

(60) Provisional application No. 60/922,877, filed on Apr. 11, 2007.

(51) Int. Cl.
- *C04B 37/00* (2006.01)
- *C09J 163/00* (2006.01)
- *C08F 283/00* (2006.01)
- *C08G 59/14* (2006.01)
- *C08L 63/00* (2006.01)

(52) U.S. Cl.
USPC .......................... 156/325; 156/330; 525/523

(58) Field of Classification Search
USPC .................. 156/325, 330; 525/523
See application file for complete search history.

(56) References Cited

U.S. PATENT DOCUMENTS

| | | |
|---|---|---|
| 4,594,291 A | 6/1986 | Bertram |
| 4,931,482 A | 6/1990 | Lamberts |
| 4,948,449 A | 8/1990 | Tarbutton |
| 5,202,390 A | 4/1993 | Mulhaupt |
| 5,278,257 A | 1/1994 | Mulhaupt |
| 5,290,857 A | 3/1994 | Ashida |
| 5,686,509 A | 11/1997 | Nakayama |
| 6,776,869 B1 | 8/2004 | Shenkel |
| 6,884,854 B2 | 4/2005 | Schoenfeld |
| 2003/0196753 A1 | 10/2003 | Schoenfeld |
| 2004/0181013 A1 | 9/2004 | Shenkel |
| 2005/0022929 A1 | 2/2005 | Schoenfeld |
| 2005/0070634 A1 | 3/2005 | Lutz |
| 2005/0209401 A1 | 9/2005 | Lutz |
| 2005/0215730 A1 | 9/2005 | Schoenfeld |
| 2006/0205897 A1 | 9/2006 | Frick |
| 2006/0276601 A1 | 12/2006 | Lutz |
| 2007/0066721 A1 | 3/2007 | Kramer |

FOREIGN PATENT DOCUMENTS

| | | |
|---|---|---|
| EP | 1632533 A | 3/2006 |
| WO | 2005-118734 A | 12/2005 |
| WO | 2006128722 A1 | 12/2006 |

OTHER PUBLICATIONS

Hajime, Sato, et al., The Yokohama Rubber Co. Ltd.; Patent Abstracts of Japan, Publication No. 59-196377; Date of Publication: Jul. 11, 1984; "Structural Adhesive".

*Primary Examiner* — Michael Orlando

(57) ABSTRACT

Epoxy adhesive compositions containing a rubber-modified epoxy resin contain a bisphenol. The bisphenol can be pre-reacted with the rubber-modified epoxy resin to advance the resin. The adhesives are resistant to thermal degradation as can occur in so-called "overbake" conditions, in which the adhesive is heated to high temperatures for prolonged periods of time. In addition, expanded microballoons are included in epoxy structural adhesives to promote a desired fracture mode.

4 Claims, No Drawings

HEAT-RESISTANT STRUCTURAL EPOXY RESINS

CROSS-REFERENCE TO RELATED APPLICATION

This application is a divisional of application no. 12/099,804, filed 9 Apr. 2008, now U.S. Pat. No. 8,097,119, and claims priority from United States Provisional Patent Application No. 60/922,877, filed 11 Apr. 2007.

BACKGROUND OF THE INVENTION

This invention relates to an epoxy resin based adhesive.

Epoxy resin based adhesives are used to bond a variety of different substrates together. In the automotive industry, epoxy resin adhesives are used to bond certain parts together. Structural adhesives are increasingly being used for metal-metal bonding in frame and other structures in automobiles. Adhesive bonding can reduce the number of welds that are needed to construct the frame, and for that reason the use of these adhesives can reduce assembly costs.

Structural adhesives for these applications are subject to very stringent performance requirements. They need to adhere well to metals that are commonly used in automotive frame structures, most commonly cold rolled steel (CRS), various types of galvanized metals, and in some cases aluminum. Any of these substrate materials may be coated with one or more coating materials, including a cationically deposited primer material which is commonly known as an "E-coat". The adhesive should be resistant to impact forces that can be experienced in collisions. Adhesives of this type are sometimes referred to as "crash durable adhesives", or "CDAs". In addition, the adhesive must maintain good bonding to the substrate and good impact resistance over a temperature range that can be as low as −40° C. and up to 80° C.

Impact properties are imparted to the adhesive composition through the use of various rubbers and tougheners. The rubber is typically a liquid polymer or copolymer of a diene monomer, such as a butadiene-acrylonitrile copolymer of the type described in U.S. Pat. No. 6,586,089 and U.S. Published Patent Application No. 2005/0070634. A commonly used toughener is a capped polyurethane and/or polyurea as described in U.S. Pat. No. 5,278,257.

In the automotive assembly process, the frame is typically bonded and welded together, and then subjected to one or more coating steps. Automotive coatings are often baked in order to cure them to produce a hard finish. The baking temperatures can range from 140° C. to over 200° C. It has been found that exposure to these temperatures can cause a deterioration of impact properties and adhesion, particularly if the exposure time to these temperatures is long. This tends to be more apparent at low temperatures. It would be desirable to provide a structural adhesive which bonds well to various metals (including cold rolled steel and various galvanized metal substrates) over a wide temperature range, and which is more resistant to exposure to high temperatures.

Another desired characteristic of these structural adhesives is the mode of failure. Cohesive failure (i.e., failure within adhesive layer rather than at the adhesive-substrate interface or by delamination of the substrate) is the preferred failure mode. In many cases, measures that impart the desired failure mode tend to reduce impact resistance. It would be desirable to provide an adhesive which mainly fails cohesively when bonded to metals such as CRS, galvanized metals and aluminum, and which has good impact properties, particularly at low temperature.

SUMMARY OF THE INVENTION

This invention is a one-component structural adhesive, comprising:
A) one or more rubber-modified epoxy resins, in which at least a portion of the rubber has a glass transition temperature of −40° C. or lower; and
B) one or more bisphenol compounds,
wherein component B) may be pre-reacted with all or a portion of component A) to form an advanced rubber-modified epoxy resin, the structural adhesive further comprising:
C) a reactive toughener; and
D) one or more epoxy curing agents;
wherein the structural adhesive is curable at a temperature of 80° C. or higher.

The structural adhesive of the invention, when cured, is surprisingly resistant to high temperatures. The bisphenol compound can be dissolved into the structural adhesive composition, or dispersed therein in the form of fine particles. Alternatively, the bisphenol compound can be pre-reacted with all or a portion of the rubber-modified epoxy resins to form an advanced material, which can be used as a component in the structural adhesive composition. In either case, the cured structural adhesive is more resistant to degradation of its bonding properties upon exposure to elevated temperatures. These benefits are seen especially in the low temperature properties of the adhesive, which are well retained after the structural adhesive has been exposed to elevated temperature conditions.

This invention is also a one-component structural adhesive, comprising:
A) one or more rubber-modified epoxy resins, in which at least a portion of the rubber has a glass transition temperature of −40° C. or lower;
B) one or more reactive tougheners;
C) from 1 to 5% by weight of the structural adhesive of expanded microballoons having an average particle size of up to 200 microns and density of up to 0.2 g/cc; and
D) one or more epoxy curing agents;
wherein the structural adhesive is curable at a temperature of 80° C. or higher.

The presence of the expanded microballoons helps the cured adhesive to achieve cohesive failure when bonded to various substrates, including CRS and galvanized metals. The expanded microballoons tend to have less adverse affect on adhesion and impact properties than do other particulate fillers.

DETAILED DESCRIPTION OF THE INVENTION

The structural adhesive of the invention includes at least one rubber-modified epoxy resin. Preferably, the rubber-modified epoxy resin is an epoxy-terminated adduct of an epoxy resin and at least one liquid rubber that has epoxide-reactive groups, such as amino or preferably carboxyl groups. At least a portion of the rubber has a glass transition temperature ($T_g$) of −40° C. or lower, preferably −50° C. or lower. Preferably, each of the rubbers (when more than one is used) has a glass transition temperature of −25° C. or lower. The rubber $T_g$ may be as low as −100° C. or even lower.

The rubber is preferably a homopolymer of a conjugated diene or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer.

The rubber preferably contains from about 1.5, more preferably from about 1.8, to about 2.5, more preferably to about 2.2, epoxide-reactive terminal groups per molecule, on average. Carboxyl-terminated rubbers are preferred. The molecular weight (Me) of the rubber is suitably from about 2000 to about 6000, more preferably from about 3000 to about 5000.

Suitable carboxyl-functional butadiene and butadiene/acrylonitrile rubbers are commercially available from Noveon under the tradenames Hycar® 2000×162 carboxyl-terminated butadiene homopolymer and Hycar® 1300×31 Hycar® 1300×8, Hycar® 1300×13, Hycar® 1300×9 and Hycar® 1300×18 carboxyl-terminated butadiene/acrylonitrile copolymers. A suitable amine-terminated butadiene/acrylonitrile copolymer is sold under the tradename Hycar® 1300×21.

The rubber is formed into an epoxy-terminated adduct by reaction with an excess of an epoxy resin. Enough of the epoxy resin is provided to react with all of the epoxide-reactive groups on the rubber and to provide free epoxide groups on the resulting adduct without significantly advancing the adduct to form high molecular weight species. A ratio of at least two equivalents of epoxy resin per equivalent of epoxy-reactive groups on the rubber is preferred. More preferably, enough of the epoxy resin compound is used that the resulting product is a mixture of the adduct and some free epoxy resin compound. Typically, the rubber and an excess of the epoxy resin are mixed together with a polymerization catalyst and heated to a temperature of about 100 to about 250° C. in order to form the adduct. Useful catalysts for conducting the reaction between the rubber and the epoxy resin include those described below. Preferred catalysts for forming the rubber-modified epoxy resin include phenyl dimethyl urea and triphenyl phosphine.

A wide variety of epoxy resins can be used to make the rubber-modified epoxy resin, including any of those described below. Preferred epoxy resins are liquid or solid glycidyl ethers of a bisphenol such as bisphenol A or bisphenol F. Halogenated, particularly brominated, resins can be used to impart flame retardant properties if desired. Liquid epoxy resins (such as DER 330 and DER 331 resins, which are diglycidyl ethers of bisphenol A available from The Dow Chemical Company) are especially preferred for ease of handling.

The rubber-modified epoxy resin(s) preferably constitute at least about 4 weight percent of the structural adhesive, more preferably at least about 5 weight percent. The rubber-modified epoxy resin may constitute up to about 30 weight percent of the structural adhesive, more preferably up to about 20 weight percent, and even more preferably up to about 15 weight percent.

The bisphenol component is any compound having two or more, preferably two, phenolic hydroxyl groups per molecule. The bisphenol component preferably has a molecular weight of 500 or less, preferably 300 or less. Examples of suitable bisphenol compounds include, for example, resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol and the like.

The bisphenol component can be dissolved into the structural adhesive composition or present in the form of finely divided particles. Preferably, the bisphenol component is pre-reacted with one or more of the rubber-modified epoxy resins to advance the resin somewhat. In some embodiments of the invention, a mixture of rubber-modified epoxy resins is used. In such cases, it is normally necessary to advance only one of the rubber-modified epoxy resins, although any number of them (or all of them) can be advanced in this manner. In some embodiments, a mixture of rubber-modified epoxy resins will include at least one component which is prepared from a rubber having a $T_g$ of greater than −40° C., and another rubber having a $T_g$ of −40° C. or below. In such cases, either or both of the rubber-modified epoxy resins may be advanced.

The bisphenol component is preferably used in an amount from about 3 to about 35 parts by weight per 100 parts by weight of the rubber component in the rubber-modified epoxy resin. A preferred amount is from about 5 to about 25 parts by weight per 100 parts by weight of the rubber component of the rubber-modified epoxy resin. When the bisphenol component is added directly into the structural adhesive, it usually constitutes from 0.25 to 2 weight percent, especially 0.4 to 1.5 weight percent, of the adhesive.

The reactive toughener is a liquid or low-melting elastomeric material having capped or blocked isocyanate, amino, hydroxyl or thiol groups. It should be soluble or dispersible in the remainder of the reactive components of the structural adhesive. Isocyanate groups can be capped or blocked with, for example, a phenolic compound, an aminophenolic compound, a primary or secondary aliphatic or cycloaliphatic amine, a benzyl alcohol, an aromatic amine, a benzyl amine or a thiol compound. Hydroxyl and thiol groups can be capped or blocked with, for example, an isocyanate compound, a cyclic carbonate or urethane, an aromatic hydroxycarboxylic acid or an aromatic aminocarboxylic acid. Amino groups can be capped, for example, with an isocyanate compound or an anhydride such as isatoic anhydride. In all cases, the capping or blocking group may contain functional groups such as phenol, aromatic amino, —OCN, epoxide, or like groups, but the capping or blocking group may instead be devoid of such groups. Tougheners of these types and methods for preparing them are described, for example, in U.S. Pat. No. 5,202,390, U.S. Pat. No. 5,278,257, WO 2005/118734, U.S. Published Patent Application No. 2005/0070634, U.S. Published Patent Application No. 2005/0209401 and U.S. Published Patent Application 2006/0276601. The elastomeric portion of the reactive toughener advantageously includes a polyether, polyamine or polyester segment. The polyether, polyamine or polyester segment may form part of a polyurethane and/or polyurea backbone.

The reactive toughener preferably has a viscosity at 45° C. which is not greater than 1000 Pa·s and more preferably no more than about 800 Pa·s. Preferably, the weight average molecular weight of the toughener is about 8,000 or greater, and more preferably about 10,000 or greater. Preferably, the weight average molecular weight of the toughener is about 70,000 or less, and more preferably about 40,000 or less. Molecular weights as used herein are determined according to GPC analysis.

The reactive toughener preferably contains an average no more than 6 blocked or capped terminal groups per molecule. Preferably the average number of such groups is at least 1, more preferably at least 2, up to about 4 per molecule.

The toughener is preferably non-crosslinked or lightly crosslinked, preferably having a crosslink density of about 2 or less and preferably about 1 or less. Crosslink density is the number of attachments between chains of polymers.

A preferred class of tougheners include those corresponding to Formula I:

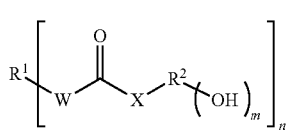

wherein m is 1 or 2, n is 2 to 6, $R^1$ is an n-valent radical of an elastomeric prepolymer after the removal of the terminal isocyanate, amino or hydroxyl group(s), the elastomeric prepolymer being soluble or dispersible in epoxy resin, W and X are independently —O— or —NR$^3$—, at least one of W and X being —NR$^3$—, $R^2$ is an m+1-valent radical of a polyphenol or aminophenol after the removal of the phenolic hydroxyl group when X is —O— and of the amino group when X is —NR$^3$—, and $R^3$ is hydrogen, a $C_1$ to $C_6$ alkyl or phenyl. Such tougheners are described in more detail in EP-A-0 308 664 (page 5, line 14, to page 13, line 24), and in U.S. Pat. No. 5,278,257 (at column 2, lines 14 to 33 and column 4, line 19 and column 16, line 18), the disclosures of which are incorporated herein by reference.

Another suitable toughener corresponds to Formula II:

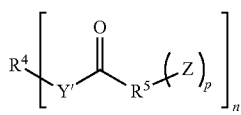

wherein p is 1 or 2, n is 2 to 6, Y' is —O—, —S— or —NR$^6$—, Z is a radical selected from the group consisting of —OH, —NHR$^6$, —OCN,

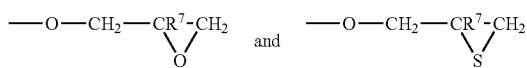

$R^4$ is a residue of a hydroxyl-, mercapto- or amino-terminated polyether prepolymer or of a hydroxyl-, mercapto- or amino-terminated prepolymeric, segmented polyester, polythioester or polyamide, $R^5$ is a carbocyclic aromatic or araliphatic p+1-valent radical with groups Z bonded directly to the aromatic ring, $R^6$ is hydrogen, $C_1$ to $C_6$ alkyl or phenyl, and $R^7$ is methyl or hydrogen. Tougheners corresponding to Formula II are described in more detail in EP-A-0 353 190 (page 3, line 51, to page 6, line 62) and U.S. Pat. No. 5,202,390 (at column 1, line 59 to column 2, line 16 and column 3, line 60 to column 9, line 21), the disclosures of which are incorporated herein by reference.

Still other suitable reactive tougheners correspond to Formula III and/or Formula IV

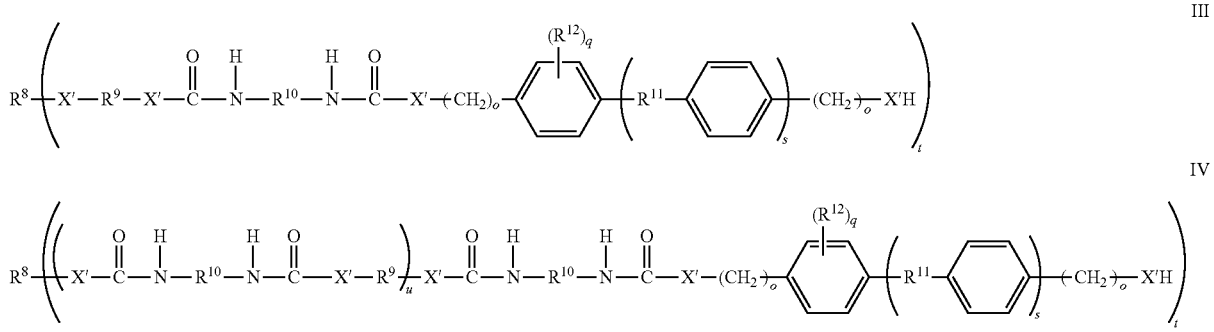

wherein $R^8$ is independently in each occurrence a $C_{2-20}$ m-valent alkyl moiety; $R^9$ is independently in each occurrence a polyether chain; $R^{10}$ is independently in each occurrence an alkylene, cycloalkylene or mixed alkylene and cycloalkylene moiety, optionally containing one or more oxygen or sulfur atoms; $R^{11}$ is a direct bond or an alkylene, carbonyl, oxygen, carboxyloxy, or amido moiety; $R^{12}$ is independently in each occurrence an alkyl, alkenyl, alkoxy, aryloxy or aryloxy moiety with the proviso that if s=1, then q=0; X' is O or —NR$^{13}$ with the proviso that X' is O where s is 1; and that where s is 0, X' is O in at least one occurrence; $R^{13}$ is independently in each occurrence hydrogen or alkyl; t is independently in each occurrence a number of about 1 to about 6; u is independently in each occurrence a number of 1 or greater; o is independently in each occurrence 0 or 1 if s is 0 and 0 if s is 1; s is independently in each occurrence 0, or 1; and q is independently in each occurrence a number of from 0 to 1.

Still another useful class of reactive tougheners corresponds to formula V:

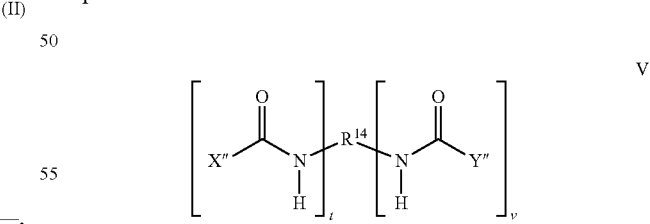

wherein $R^{14}$ is the elastomeric prepolymer residue, said residue having a valence of t+v=2 to 6 with t=1 to 6 and v=0 to 5, X" is the residue of the primary aliphatic, cycloaliphatic, heteroaromatic and/or araliphatic amine and/or the secondary aliphatic, cycloaliphatic, aromatic, heteroaromatic and/or araliphatic amine, the thiol and/or the alkyl amide and Y" is the residue of the phenol and/or the polyphenol.

Preferred reactive tougheners are isocyanate-terminated prepolymers formed from a polyether polyol and an aliphatic polyisocyanate, in which the terminal isocyanate groups are blocked with a phenol, aminophenol, polyphenol or an allylphenol, such as o,o-diallyl bisphenol A.

The reactive toughener is present in sufficient amount to improve the performance of adhesive compositions containing it under dynamic load. Preferably, the reactive toughener constitutes at least about 5 weight percent of the structural adhesive, preferably at least about 8 weight percent and most preferably at least about 12 weight percent. Preferably, the reactive toughener constitutes up to about 40 weight percent of the structural adhesive, preferably up to about 30 weight percent and more preferably up to about 25 weight percent.

The structural adhesive further contains a curing agent. The curing agent is selected together with any catalysts such that the adhesive cures when heated to a temperature of 80° C., preferably at least 100° C. or greater, but cures very slowly if at all at room temperature (~22° C.) and at temperatures up to at least 50° C. Suitable such curing agents include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

The curing agent is used in sufficient amount to cure the composition. The curing agent suitably constitutes at least about 1.5 weight percent of the structural adhesive, and more preferably at least about 2.5 weight percent. The curing agent preferably constitutes up to about 15 weight percent of the adhesive composition, more preferably up to about 10 weight percent, and most preferably about 6 weight percent.

The structural adhesive will in most cases contain a catalyst for the cure of the adhesive. Among preferred epoxy catalysts are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl)phenol, piperidine or derivates thereof, imidazole derivates, in general $C_1$-$C_{12}$ alkylene imidazole or N-arylimidazols, such as 2-ethyl-2-methylimidazol, or N-butylimidazol, 6-caprolactam, a preferred catalyst is 2,4,6-tris(dimethylaminomethyl)phenol integrated into a poly(p-vinylphenol) matrix (as described in European patent EP 0 197 892). The catalyst may be encapsulated or otherwise be a latent type which becomes active only upon exposure to elevated temperatures. Preferably, the catalyst is present in the adhesive composition in the amount of at least about 0.1 weight percent of the structural adhesive, and most preferably about 0.2 weight percent. Preferably, the epoxy curing catalyst is present in an amount of up to about 2 weight percent of the structural adhesive, more preferably up to about 1.0 weight percent, and most preferably about 0.7 weight percent.

The structural adhesive of the invention may contain various optional components. Among these, fillers, rheology modifiers or pigments, one or more additional epoxy resins and a core-shell rubber are particularly preferred.

A filler, rheology modifier and/or pigment is preferably present in the structural adhesive. These can perform several functions, such as (1) modifying the rheology of the adhesive in a desirable way, (2) reducing overall cost, (3) absorbing moisture or oils from the adhesive or from a substrate to which it is applied, and/or (4) promoting cohesive, rather than adhesive, failure. Examples of these materials include calcium carbonate, calcium oxide, talc, coal tar, carbon black, bitumen, textile fibers, glass particles or fibers, asbestos fibers, boron fibers, carbon fibers, mineral silicates, mica, powdered quartz, hydrated aluminum oxide, bentonite, wollastonite, kaolin, fumed silica, silica aerogel or metal powders such as aluminum powder or iron powder. Among these, calcium carbonate, talc, calcium oxide, fumed silica and wollastonite are preferred, either singly or in some combination, as these often promote the desired cohesive failure mode.

A filler of particular interest is a microballoon having an average particle size of up to 200 microns and density of up to 0.2 g/cc. The particle size is preferably about 25 to 150 microns and the density is preferably from about 0.05 to about 0.15 g/cc. Expanded microballoons which are suitable include those commercially available from Dualite Corporation under the trade designation Dualite™, and also from Lehmann & Voss, Hamburg, Germany. Specific examples of suitable polymeric microballoons include Dualite™ E065-135 and Dualite E130-40D microballoons. Microballoons of the type have been found to strongly promote the desired cohesive failure when used at a level of from about 1 to about 5 weight percent, preferably 1.5 to 3 weight percent, of the structural adhesive. Microballoons are preferably used in conjunction with one or more additional fillers, such as talc, calcium oxide, wollastonite, calcium carbonate, fumed silica or mixtures thereof.

Fillers, rheology modifiers and pigments preferably are used in an aggregate amount of about 5 parts per hundred parts of adhesive composition or greater, more preferably about 10 parts per hundred parts of adhesive composition or greater. They preferably are present in an amount of up to about 25 weight percent of the structural adhesive, more preferably up to about 20 weight percent, and most preferably up to about 15 weight percent.

The structural adhesive preferably contains at least one epoxy resin which is not rubber-modified, in addition to the rubber-modified epoxy resin described before. As noted, in some instances the rubber-modified epoxy resin may contain some quantity of epoxy resin which is not reacted with the rubber, and some amount of additional epoxy resin may be brought into the structural adhesive in that manner. Alternatively or in addition, the additional epoxy resin may be separately added to the structural adhesive.

The additional epoxy resin may be the same or different from that used to prepare the rubber-modified epoxy resin. A wide range of epoxy resins can be used as the additional epoxy resin including those described at column 2 line 66 to column 4 line 24 of U.S. Pat. No. 4,734,332, incorporated herein by reference.

Suitable epoxy resins include the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol, diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof.

Suitable diglycidyl ethers include diglycidyl ethers of bisphenol A resins such as are sold by Dow Chemical under the designations D.E.R.® 330, D.E.R.® 331, D.E.R.® 332, D.E.R.® 383, D.E.R. 661 and D.E.R.® 662 resins.

Commercially available diglycidyl ethers of polyglycols include those sold as D.E.R.® 732 and D.E.R.® 736 by Dow Chemical.

Epoxy novolac resins can be used. Such resins are available commercially as D.E.N.® 354, D.E.N.® 431, D.E.N.® 438 and D.E.N.® 439 from Dow Chemical.

Other suitable additional epoxy resins are cycloaliphatic epoxides. A cycloaliphatic epoxide includes a saturated carbon ring having an epoxy oxygen bonded to two vicinal atoms in the carbon ring, as illustrated by the following structure III:

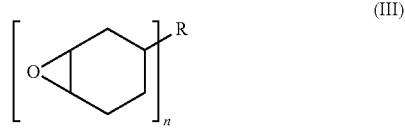

wherein R is an aliphatic, cycloaliphatic and/or aromatic group and n is a number from 1 to 10, preferably from 2 to 4. When n is 1, the cycloaliphatic epoxide is a monoepoxide. Di- or epoxy resins are formed when n is 2 or more. Mixtures of mono-, di- and/or epoxy resins can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl)adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Dow Chemical) can be used.

The additional epoxy resin preferably is a bisphenol-type epoxy resin or mixture thereof with up to 10 percent by weight of another type of epoxy resin. Preferably the bisphenol type epoxy resin is a liquid epoxy resin or a mixture of a solid epoxy resin dispersed in a liquid epoxy resin. The most preferred epoxy resins are bisphenol-A based epoxy resins and bisphenol-F based epoxy resins.

The additional epoxy resin or epoxide resin is used in sufficient amount to impart desirable adhesive and strength properties. Preferably, the additional epoxy resin constitutes at least about 10 weight percent of the structural adhesive, more preferably at least about 15 weight percent, and most preferably at least about 20 weight percent. The additional epoxy resin preferably constitutes up to about 60 weight percent of the structural adhesive, more preferably up to about 50 weight percent, and most preferably up to about 40 weight percent.

Another highly preferred but optional component is a core-shell rubber.

Core-shell rubbers are well known. They contain at least one core portion which is a rubbery material preferably having a $T_g$ of less than −10° C., more preferably less than −40° C., even more preferably less than −50° C. and still more preferably less than −70° C., and at least one shell portion that preferably has a $T_g$ of at least 50° C. The $T_g$ of the rubbery core may be well below −100° C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked. The rubbery core may constitute from 50 to 95%, especially from 60 to 90% of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethyl-hexylacrylate. The core polymer may in addition contain up to 20% by weight of other copolymerized monounsaturated monomers such as styrene, vinyl acetate, vinyl chloride, methyl methacrylate, and the like. The core polymer is optionally crosslinked. The core polymer also optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl™.

The shell polymer, which is optionally chemically grafted or crosslinked to the rubbery core, is preferably polymerized from at least one lower alkyl methacrylate such as methyl-, ethyl- or t-butyl methacrylate. Homopolymers of such methacrylate monomers can be used. Further, up to 40% by weight of the shell polymer can be formed from other monovinylidene monomers such as styrene, vinyl acetate, and vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups such as are provided by monomers such as glycidyl methacrylate are suitable.

A particularly preferred type of core-shell rubber is of the type described in EP 1 632 533 A1. Core-shell rubber particles as described in EP 1 632 533 A1 include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX 156 and Kaneka Kane Ace MX 120. These materials are pre-dispersed in an epoxy resin, which becomes an additional epoxy resin as described before.

The core-shell rubber particles can constitute from 0 to 30 weight percent of the structural adhesive. The particles preferably constitute at least 1 weight percent and more preferably at least 1.25 weight percent of the structural adhesive. The core-shell rubber particles preferably constitute no more than 10 weight percent, more preferably no more than 5 weight percent of the structural adhesive.

The amount of core-shell rubber particles (if any) and the amount of rubber-modified epoxy resin are selected together such that the total rubber content of the structural adhesive is at least 4 weight percent. The total rubber content may be as much as 30 weight percent, preferably from 6 to 20 weight percent and more preferably from 8 to 15 weight percent of the structural adhesive.

Total rubber content is calculated for purposes of this invention by determining the weight of core-shell rubber particles (if any), plus the weight contributed by the liquid rubber portion of the rubber-modified epoxy resin(s). In each case, the weight of unreacted (non-rubber-modified) epoxy resins and/or other carriers, diluents, dispersants or other ingredients that may be contained in the core-shell rubber product or rubber-modified epoxy resin is not included. The weight of the shell portion of the core-shell rubber is counted as part of the total rubber content for purposes of this invention.

Particularly preferred structural adhesives of the invention have a total rubber content of at least 6 weight percent, especially from 8 to 20 weight percent, and also contain 10% or more, especially 12% or more, of the reactive toughener.

The structural adhesive can further contain other additives such as diluents, plasticizers, extenders, pigments and dyes, fire-retarding agents, thixotropic agents, flow control agents, such as silicones, waxes and stearates, which can, in part, also be used as mold release agents, adhesion promoters, antioxidants and light stabilizers.

Especially preferred structural adhesives have the following compositions:

| Component | Weight Percent |
|---|---|
| Core-shell rubber particles, $T_g$ of rubber portion <−70° C. | 0-10, preferably 1.25-5 |
| Rubber-modified epoxy resin(s) | 4-25, preferably 5-20 |
| Bisphenol component | 0.25-2.0, preferably 0.4-1.5 |
| Reactive Toughener | 5-25, preferably 10-20 |
| Reactive Diluent | 0-8 |
| Curing agent | 2.5-8, preferably 3-6 |
| Catalyst | 0.2-2, preferably 0.4-0.8 |
| Talc | 0-5, preferably 0.4-2 |
| Calcium oxide | 0-10, preferably 1-8 |
| Expanded Microballoons | 0-4, preferably 1-2 |
| Wollastonite | 0-15, preferably 2-15 |
| Calcium Carbonate | 2-20, preferably 8-15 |
| Fumed Silica | 1-12, preferably 2-8 |
| Additional Epoxy Resin | 0-60, preferably 15-40 |
| Total Fillers | 5-25 |
| % Total Rubber | 8-15 |

The adhesive composition can be applied by any convenient technique. It can be applied cold or be applied warm if desired. It can be applied by extruding it from a robot into bead form on the substrate, it can be applied using mechanical application methods such as a caulking gun, or any other manual application means, it can also be applied using a swirl technique. The swirl technique is applied using an apparatus well known to one skilled in the art such as pumps, control systems, dosing gun assemblies, remote dosing devices and application guns. The adhesive may be applied to the substrate using a streaming process. Generally, the adhesive is applied to one or both substrates. The substrates are contacted such that the adhesive is located between the substrates to be bonded together.

After application, the structural adhesive is cured by heating to a temperature at which the curing agent initiates cure of the epoxy resin composition. Generally, this temperature is about 80° C. or above, preferably 100° C. or above. Preferably, the temperature is about 220° C. or less, and more preferably about 180° C. or less.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or parts to automobiles. Such parts can be steel, coated steel, galvanized steel, aluminum, coated aluminum, plastic and filled plastic substrates.

An application of particular interest is bonding of automotive frame components to each other or to other components. The frame components are often metals such as cold rolled steel, galvanized metals, or aluminum. The components that are to be bonded to the frame components can also be metals as just described, or can be other metals, plastics, composite materials, and the like.

Adhesion to brittle metals such as galvaneal is of particular interest in the automotive industry. Galvaneal tends to have a zinc-iron surface that is somewhat rich in iron content and is brittle for that reason. A particular advantage of this invention is that the cured adhesive bonds well to brittle metals such as galvaneal. This is particularly the case when the core-shell rubber particles constitute at least 2.5 weight percent of the structural adhesive, the total rubber content of the structural adhesive is at least 10 weight % and the structural adhesive contains at least 10 weight % of the reactive toughener.

Assembled automotive frame members are usually coated with a coating material that requires a bake cure. The coating is typically baked at temperatures that may range from 140° C. to over 200° C. In such cases, it is often convenient to apply the structural adhesive to the frame components, then apply the coating, and cure the adhesive at the same time the coating is baked and cured.

In automotive applications, thermal degradation of a structural adhesive tends to come from two main causes. The first cause is excessive time and/or temperature conditions during the cure of the structural adhesive (which may be done at the same time a coating is baked and cured.) Further exposures to elevated temperatures may occur as the baking process may be repeated one or more additional times during the vehicle manufacturing process, as different coatings are applied and cured during different stages of manufacture. A good structural adhesive for these applications therefore should be able to withstand these temperatures and still retain good adhesive properties. Adhesive properties at cold temperatures (such as −30° C. or −40° C.) are usually most affected by heat degradation that occurs during these baking steps.

It has been found that the inclusion of the bisphenol compound, when used in conjunction with at least one rubber-modified epoxy resin in which the resin has a $T_g$ of −40° C. or less, tends to make the cured structural adhesive more resistant to high temperatures, so that the cured adhesive, after exposure to high temperatures, retains more of its adhesive strength, especially at low temperatures. A useful method for evaluating this is the ISO 11343 Impact Peel Testing method which is described more fully in the examples. A preferred structural adhesive of the invention exhibits an impact peel strength of at least 25 N/mm, preferably at least 30 N/mm, when measured at room temperature after baking at 190° C. for 60 minutes or more. A preferred structural adhesive of the invention also exhibits an impact peel strength of at least 15 N/mm, preferably at least 18 N/mm, when measured at −40° C. after baking at 190° C. for 60 minutes or more.

An especially preferred structural adhesive of the invention also exhibits (when cured) mainly cohesive failure when evaluated in a T-Peel testing method as described below in the Examples. Balancing cohesive failure with high impact peel strength is usually difficult, as formulation changes that favor cohesive failure, such as the inclusion of higher levels of fillers, often tend to reduce impact peel.

The adhesive composition once cured preferably has a Young's modulus of about 1200 MPa as measured according to DIN EN ISO 527-1. More preferably, the Young's modulus is about 1400 MPa or greater. Preferably, the cured adhesive demonstrates a tensile strength of about 30 MPa or greater, more preferably about 35 MPa or greater, and most preferably about 40 MPa or greater. Preferably, the adhesive demonstrates an elongation of about 3 percent or greater, more preferably about 5 percent or greater, and most preferably about 9 percent or greater as measured according to DIN EN ISO 527-1. Preferably, the lap shear strength of a 1.5 mm thick cured adhesive layer is about 15 MPa or greater, more preferably about 20 MPa or greater, and most preferably about 25 MPa or greater measured according to DIN EN 1465.

The following examples are provided to illustrate the invention but are not intended to limit the scope thereof. All parts and percentages are by weight unless otherwise indicated.

Products used in the following examples are identified as follows:

DER™ 330 is a liquid diglycidyl ether of bisphenol A, available from The Dow Chemical Company. It has an epoxy equivalent weight of approximately 180.

DER™ 331 is a liquid diglycidyl ether of bisphenol A, available from The Dow Chemical Company. It has an epoxy equivalent weight of approximately 187.

Struktol 3611 is a reaction product of approximately 50% of a liquid diglycidyl ether of bisphenol F, 40% of Hycar 1300×13 rubber (a carboxy-terminated butadiene-acrylonitrile copolymer having a $T_g$ greater than −40° C., available from Noveon) and from 2 to 5% of bisphenol A. It is commercially available from Schill & Seilacher.

Struktol™ 3604 is a reaction product of approximately 60% of a liquid diglycidyl ether of bisphenol A and 40% of Hycar 1300×8 rubber (a carboxy-terminated butadiene-acrylonitrile copolymer having a $T_g$ of about −52° C., available from Noveon). It is commercially available from Schill & Seilacher.

Advanced Struktol™ 3604 is the reaction product of Struktol™ 3604 with bisphenol A, at a weight ratio of about 10:0.6.

RAM 965 reactive toughener is an isocyanate-terminated polyurethane prepolymer prepared from a polyether polyol and an aliphatic diisocyanate, in which the isocyanate groups are capped with o,o-diallyl bisphenol A, and is made as described in Example 13 of EP 308 664.

RAM B reactive toughener is an isocyanate-terminated polyurethane prepolymer prepared from a polyether polyol and an aliphatic diisocyanate, in which the isocyanate groups are capped with bisphenol A. It is described as Toughener B in U.S. Published Patent Application No. 2005/0070634.

Cardura™ E10 is versatic acid monoepoxy ester, available from Shell Chemicals.

Synquest Silane A187 is an epoxy silane available from GE Silicones.

Amicure™ CG-1200 is a cyanoguanidine epoxy hardener available from Air Products and Chemicals.

EP796 is tris (2,4,6-dimethylaminomethyl)phenol in a polymer matrix, available from Huntsman Chemicals.

Dualite™ E065-135 is an expanded microballoon having a bulk density of 0.065 g/cc and an average particle size of 135 microns.

Dualite E136-040D is an expanded microballoon having a bulk density of 0.13 g/cc and an average particle size of 40 microns.

Nyad™ M400 is a particulate wollastonite from Nyco.

Microthene™ FE53200 is a 20 micron, 8 melt index, 0.926 density powered ethylene vinylacetate copolymer from Equistar Chemicals.

Aerosil™ R202 and Aerosil R805 are particulate fumed silica products from Degussa.

Kaneka Kane Ace MX 156 is a dispersion of about 25% of a core-shell rubber in an epoxy resin. The core-shell rubber has a crosslinked polybutadiene core. It is available commercially from Kaneka Corporation.

EXAMPLES 1 and 2

Structural adhesive Examples 1 and 2 are prepared from the components set forth in Table 1.

TABLE 1

|  | Parts By Weight Example No. | |
| --- | --- | --- |
| Components | 1 | 2 |
| DER 330 Epoxy Resin | 34.2 | 34.2 |
| Strutkol 3611 | 17.1 | 17.1 |
| Struktol 3604 | 11.5 | 11.5 |
| RAM 965 | 18.9 | 18.9 |
| Cardura E10 | 1.2 | 1.2 |
| Colorants | 0.4 | 0.4 |
| Synquest Silane A187 | 0.7 | 0.7 |
| Amicure CG-1200 | 3.8 | 3.8 |
| EP796 | 0.9 | 0.9 |
| Dualite E065-135 | 1.0 | 1.0 |
| Nyad M400 | 0 | 15.0 |
| Calcium Carbonate | 15.0 | 0 |
| Microthene FE53200 | 2.0 | 2.0 |
| Aerosil R202 | 4.0 | 4.0 |

The epoxy resin, rubber-modified epoxy resins, toughener and colorants, RAM 1086, Amicure CG-1200 and EP 796 are mixed on a planetary mixture for about 5 minutes. Waste heat raises the temperature of the mixture to about 50° C. One-half of each of the remaining ingredients is then added and the mixture stirred at about 50° C. for about 10 minutes. The remainder of the components is then added and the resulting mixture is stirred for another 10 minutes at about 50° C. A scrape-down is performed, and the components are mixed further for 30 minutes under vacuum.

Impact peel testing is performed with each of Examples 1 and 2, in accordance with ISO 11343 wedge impact method. Testing is performed using an Instron Dynatup 8250 device operated at 2 mm/sec. The substrate is hot dipped galvanized steel, Advanced Coatings Technology ACT HDG G70 70U Cut Only Unpolished grade.

Multiple test samples are prepared using each of Example 1 and Example 2.

Test coupons are 100 mm×20 mm with a bonded area of 20×30 mm. The samples are prepared by wiping them with acetone. A 0.15 mm×10 mm wide Teflon tape is applied to the coupons to define a 20×30 bond area. An oil (Quaker Ferrocoate 61 AUS) is applied to one coupon. A lighter level of oil is applied to the other coupon. The structural adhesive is then applied to the bond area of latter coupon and squeezed onto the first coupon to prepare each test specimen.

Duplicate test specimens for each of Examples 1 and 2 are baked at 170° C. for 30 minutes. Other duplicate test specimens for each of Examples 1 and 2 are baked at 190° C. for 100 minutes. One of the test specimens from each of the 170° C. and 190° C. bakes are cooled to room temperature and their impact peel strength is measured. Other test specimens from each bake temperature are cooled to ~−40° C. for one hour, and then immediately tested.

Examples 1 and 2 are separately evaluated for failure mode according to General Motors test specification GMW15200, at a rate of 50 mm/minute. 25 mm×100 mm coupons are bent at 90 degrees to form a "T"-shape with the end to be tested 75 mm long. The adhesive is applied between the coupons and cured as described for the peel impact test. Testing is continued until the sample breaks apart. The fracture mode is evaluated visually, with cohesive failure being indicated by the lack of visible metal in the bond area.

Results of the impact peel and T-peel testing are as indicated in Table 2.

TABLE 2

| Impact Peel | Ex. 1 | Ex. 2 |
|---|---|---|
| 170° Bake, RT testing, N/mm | 25 | 30 |
| 170° C. Bake, −40° C. testing, N/mm | 19 | 30 |
| 190° C. Bake, RT testing, N/mm | 19 | 21 |
| 190° C. Bake, −40° C. testing, N/mm | 12 | 19 |
| T-peel failure mode, 170° C. Bake | ND | Cohesive |
| T-peel failure mode, 190° C. Bake | Cohesive | Cohesive |

ND = not determined.

EXAMPLES 3-6

Structural Adhesive Examples 3-6 are prepared and tested in the same general manner as described for Examples 1 and 2, except that impact peel testing is performed only on samples baked at 190° C. for 100 minutes, and T-peel evaluations are done on samples baked at 160° C. for 15 minutes, 170° for 30 minutes and 190° C. for 100 minutes. Components used to make Examples 3-6 are as indicated in Table 3. Results are as indicated in Table 4.

TABLE 3

| Components | Ex. 3 | Ex. 4 | Ex. 5 | Ex. 6 |
|---|---|---|---|---|
| Kaneka Kane Ace MX 156 | 15.0 | 15.0 | 0 | 15.0 |
| DER 330 Epoxy Resin | 21.2 | 21.2 | 21.2 | 21.2 |
| Strutkol 3611 | 10.6 | 10.6 | 10.6 | 0 |
| Struktol 3604 | 10.0 | 10.0 | 19.4 | 10 |
| Advanced Struktol 3604 | 0 | 0 | 0 | 10.6 |
| RAM 965 | 16.7 | 0 | 16.7 | 16.7 |
| RAM B | 0 | 16.7 | 0 | 0 |
| Cardura E10 | 1.1 | 1.1 | 1.1 | 1.1 |
| Colorants | 0.3 | 0.3 | 0.3 | 0.3 |
| Wetting Agent | 0.3 | 0.3 | 0.3 | 0.3 |
| Synquest Silane A187 | 0.7 | 0.7 | 0.7 | 0.7 |
| Amicure CG-1200 | 4.4 | 4.4 | 4.4 | 4.4 |
| EP796 | 0.7 | 0.7 | 0.7 | 0.7 |
| Calcium Oxide | 0.5 | 0.5 | 0.5 | 0.5 |
| Dualite E065-135 | 0 | 0 | 0 | 0 |
| Nyad M400 | 2.2 | 2.2 | 2.2 | 2.2 |
| Calcium Carbonate | 12.0 | 12.0 | 12.0 | 12.0 |
| 10 mil glass beads | 0.5 | 0.5 | 0.5 | 0.5 |
| Aerosil R805 | 3.3 | 3.3 | 3.3 | 3.3 |
| Aerosil R202 | 1.7 | 1.7 | 1.7 | 1.7 |

TABLE 4

| Impact Peel | Ex. 3 | Ex. 4 | Ex. 5 | Ex. 6 |
|---|---|---|---|---|
| 170° Bake, RT testing, N/mm | ND | 33 | 34 | ND |
| 170° C. Bake, −40° C. testing, N/mm | ND | 25 | 27 | ND |
| 190° C. Bake, RT testing, N/mm | ND | 34 | 32 | ND |
| 190° C. Bake, −40° C. testing N/mm | 28 | 24 | 21 | 31 |
| T-peel failure mode, 160° C. Bake | Cohesive | Cohesive | Cohesive | ND |
| T-peel failure mode, 170° C. Bake | Cohesive | Cohesive | Cohesive | Adhesive |
| T-peel failure mode, 190° Bake | Cohesive | Cohesive | Cohesive | Thin Film |

ND—not determined. Thin film failure is a mainly cohesive failure near the bond line between the adhesive and substrate.

EXAMPLES 7-9

Structural Adhesive Examples 7-9 are prepared and tested in the same general manner as described for Examples 1 and 2, except that impact peel testing and T-peel testing are performed only on samples baked at 170° C. for 30 minutes. Components used to make Examples 7-9 are as indicated in Table 5. Results are as indicated in Table 6.

TABLE 5

| Components | Ex. 7 | Ex. 8 | Ex. 9 |
|---|---|---|---|
| Kaneka Kane Ace MX 156 | 15.0 | 15.0 | 15.0 |
| DER 330 Epoxy Resin | 21.2 | 21.2 | 21.2 |
| Strutkol 3611 | 10.6 | 10.6 | 10.6 |
| Struktol 3604 | 10.0 | 10.0 | 10.0 |
| RAM 965 | 16.7 | 16.7 | 16.7 |
| Cardura E10 | 1.1 | 1.1 | 1.1 |
| Colorants | 0.3 | 0.3 | 0.3 |
| Wetting Agent | 0.3 | 0.3 | 0.3 |
| Synquest Silane A187 | 0.7 | 0.7 | 0.7 |
| Amicure CG-1200 | 4.4 | 4.4 | 4.4 |
| EP796 | 0.7 | 0.7 | 0.7 |
| Calcium Oxide | 0.5 | 0.5 | 0.5 |
| Dualite E065-135 | 0 | 2 | 0 |
| Dualite E136-040D | 0 | 0 | 2 |
| Nyad M400 | 2.2 | 2.2 | 2.2 |
| Calcium Carbonate | 12.0 | 12.0 | 12.0 |
| Aerosil R805 | 3.3 | 3.3 | 3.3 |
| Aerosil R202 | 1.7 | 1.7 | 1.7 |

TABLE 6

| Impact Peel | Ex. 7 | Ex. 8 | Ex. 9 |
|---|---|---|---|
| 170° Bake, RT testing, N/mm | 36 | 33 | 30 |
| 170° C. Bake, −40° C. testing, N/mm | 27 | 26 | 18 |
| T-peel failure mode, 170° C. Bake | Adhesive | Cohesive | 37% Cohesive |

EXAMPLES 10 and 11

Structural Adhesive Examples 10 and 11 are prepared and tested in the same general manner as described for Examples 1 and 2, except that impact peel and T-peel testing are performed on samples baked at 160° C. for 25 minutes, 170° C. for 40 minutes and 190° C. for 60 minutes. Components used to make Examples 10 and 11 are as indicated in Table 7. Results are as indicated in Table 8.

TABLE 7

| | Parts By Weight Example No. | |
|---|---|---|
| Components | 10 | 11 |
| Kaneka Kane Ace 156 | 12 | 14.7 |
| DER 330 Epoxy Resin | 23.0 | 0 |
| DER 331 Epoxy Resin | 0 | 19.2 |

TABLE 7-continued

| Components | Parts By Weight Example No. 10 | Parts By Weight Example No. 11 |
| --- | --- | --- |
| Strutkol 3611 | 11.5 | 0 |
| Struktol 3604 | 10.9 | 20.3 |
| RAM B | 14.0 | 16.6 |
| Cardura E10 | 1.1 | 1.1 |
| Colorants | 0.3 | 0.3 |
| Wetting Agent | 0.3 | 0.3 |
| Synquest Silane A187 | 0.7 | 0.6 |
| Amicure CG-1200 | 3.1 | 4.3 |
| EP796 | 0.8 | 0.7 |
| Dualite E065-135 | 0 | 1.5 |
| Talc | 0.8 | 0 |
| Nyad M400 | 2.4 | 2.2 |
| Calcium Carbonate | 8.0 | 7.9 |
| Aerosil R805 | 3.6 | 3.3 |
| Aerosil R202 | 1.8 | 1.6 |

TABLE 8

| Impact Peel | Ex. 10 | Ex. 11 |
| --- | --- | --- |
| 160° Bake, RT testing, N/mm | 30 | 31 |
| 160° C. Bake, −40° C. testing, N/mm | 27 | 29 |
| 190° C. Bake, RT testing, N/mm | 39 | 35 |
| 190° C. Bake, −40° C. testing, N/mm | 36 | 29 |
| T-peel failure mode, 170° C. Bake | Cohesive | Cohesive |
| T-peel failure mode, 190° Bake | Adhesive | Cohesive |

What is claimed is:

1. A one-component structural adhesive, comprising:

A) from 5 to 30 weight percent of one or more rubber-modified epoxy resins, in which at least a portion of the rubber has a glass transition temperature of −40° C. or lower; and B) from 5 to 25 parts by weight, per 100 parts by weight of the rubber component of the rubber-modified epoxy resin(s), of one or more bisphenol compounds, wherein component B) is pre-reacted with all or a portion of component A) to form an advanced rubber-modified epoxy resin or is present in the form of finely divided particles, the structural adhesive further comprising:

C) at least 8 weight percent of a reactive toughener; and

D) one or more epoxy curing agents;

wherein the total rubber content is from 8 to 15 weight percent of the structural adhesive and the structural adhesive is curable at a temperature of 80° C. or higher.

2. The structural adhesive of claim 1 further comprising particles of a core-shell rubber.

3. A method comprising applying the structural adhesive of claim 1 between the surfaces of two metals, and curing the structural adhesive to form an adhesive bond between the two metals.

4. The structural adhesive of claim 1, wherein the bisphenol compound is present in the form of finely divided particles and constitutes 0.4 to 1.5 weight percent of the structural adhesive.

* * * * *